W. WOLLBRINCK.
WAFER CUTTING MACHINE.
APPLICATION FILED JULY 27, 1910.
1,012,230.
Patented Dec. 19, 1911.
4 SHEETS—SHEET 3.
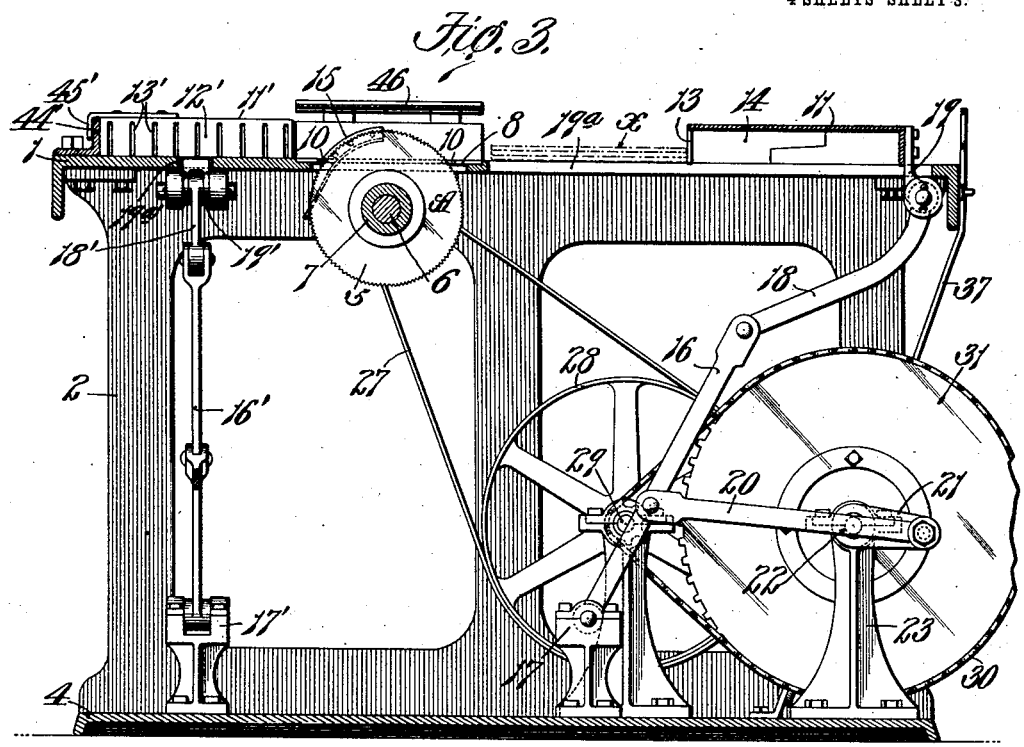
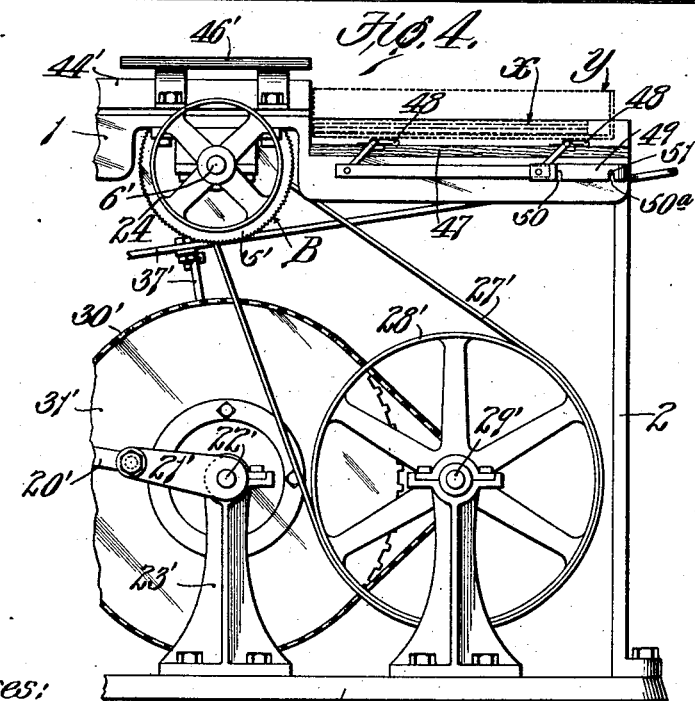

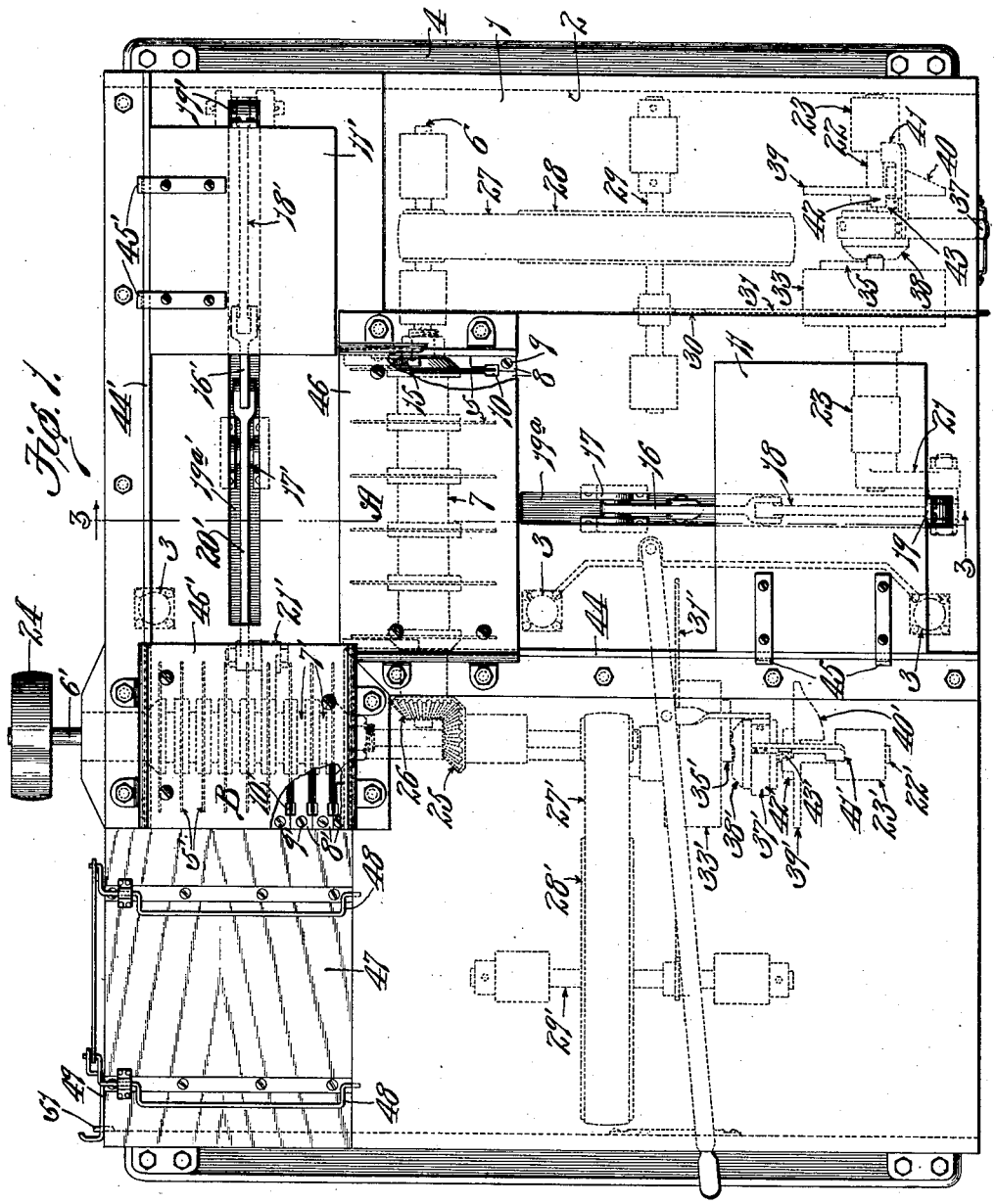

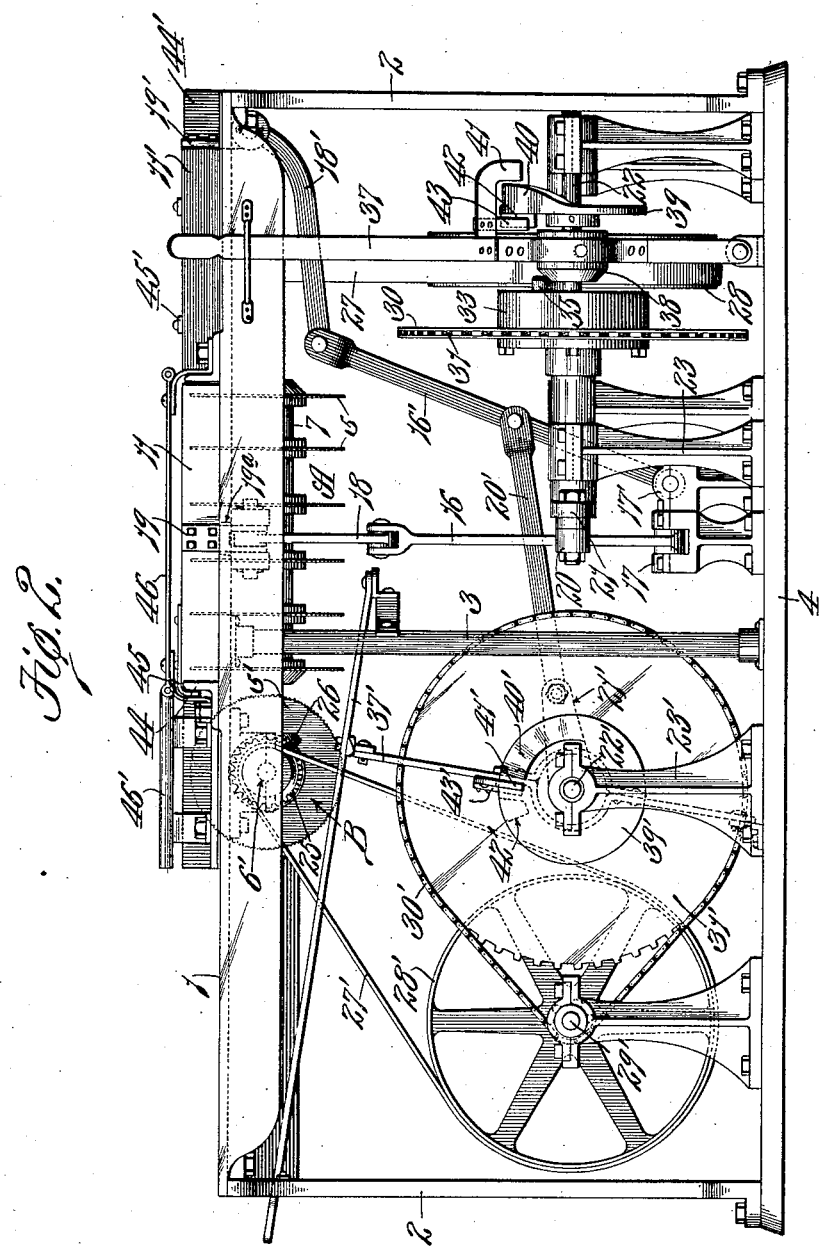

W. WOLLBRINCK.
WAFER CUTTING MACHINE.
APPLICATION FILED JULY 27, 1910.
1,012,230.
Patented Dec. 19, 1911.
4 SHEETS—SHEET 4.
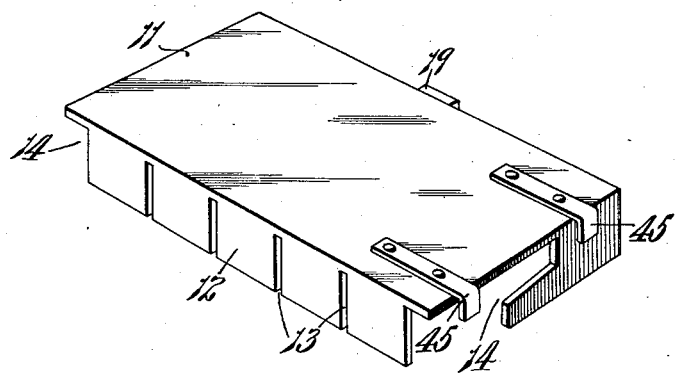
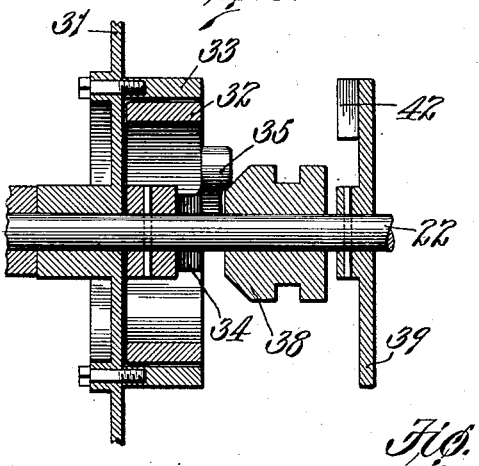
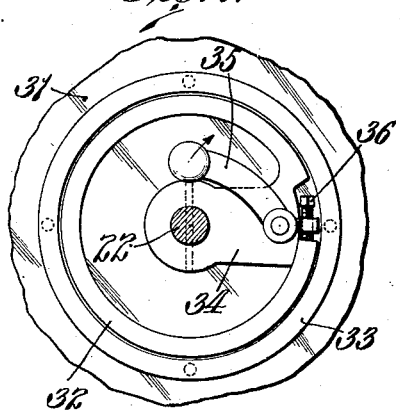
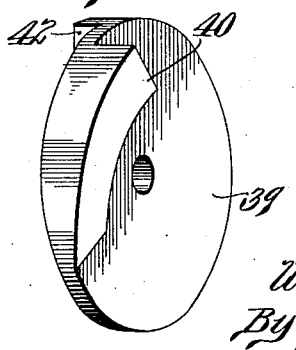
Witnesses:
Geo. R. Ladson
Nella L. Church
Inventor,
William Wollbrinck.
By Paul Bakewell Atty.

UNITED STATES PATENT OFFICE.

WILLIAM WOLLBRINCK, OF ST. LOUIS, MISSOURI, ASSIGNOR TO LOOSE-WILES BISCUIT COMPANY, OF ST. LOUIS, MISSOURI, A CORPORATION OF MISSOURI.

WAFER-CUTTING MACHINE.

1,012,230.   Specification of Letters Patent.   Patented Dec. 19, 1911.

Application filed July 27, 1910. Serial No. 574,088.

*To all whom it may concern:*

Be it known that I, WILLIAM WOLLBRINCK, a citizen of the United States, residing at St. Louis, Missouri, have invented a certain new and useful Improvement in Wafer-Cutting Machines, of which the following is a full, clear, and exact description, such as will enable others skilled in the art to which it appertains to make and use the same.

This invention relates to machines that are used for cutting large sheets of material into small rectangular-shaped pieces, and particularly to machines that are used for sawing large sheets of bakery products into small pieces so as to produce wafers or cakes.

The main object of my invention is to provide a machine that will cut a number of superimposed sheets into small pieces and which comprises means for feeding the sheets automatically in a plurality of different directions to a plurality of saws arranged at an angle to each other.

Another object is to provide a machine of the character described which is so designed that large sheets of bakery products can be cut quickly into small pieces without liability of breaking the sheets.

Another object is to provide a machine of the character described having a feed mechanism of novel construction for moving the sheets into position to be engaged by the saws or cutting mechanism. And still another object is to provide a cake or wafer cutting machine that will turn out a large number of perfectly cut cakes or wafers rapidly, and which is so designed that the uncut sheets can be introduced onto the machine easily, and the cut cakes or wafers removed from the machine easily and without liability of breaking them.

Figure 1 of the drawings is a top plan view of a machine constructed in accordance with my invention; Fig. 2 is a front elevational view of said machine; Fig. 3 is a vertical sectional view taken on approximately the line 3—3 of Fig. 1; Fig. 4 is a rear elevational view of a portion of the machine; Fig. 5 is a perspective view of one of the pushers that feeds the sheets to the saws; Fig. 6 is a detail sectional view of one of the clutches that forms part of the feeding mechanism; Fig. 7 is a side elevational view of the clutch shown in Fig. 6; and Fig. 8 is a perspective view of one of the cams that causes the cam shaft of the feeding mechanism to be disconnected from the means which operates same.

Referring to the drawings which illustrate the preferred form of my invention, 1 designates the horizontally disposed work-table of the machine which is supported by side frames 2 and standards 3 which are connected to a bed-plate 4.

The machine herein shown is provided with two gang saws A and B arranged at approximately right angles to each other and a separate and distinct feeding mechanism coöperating with each of said saws for presenting the sheets thereto. The gang saw A is composed of a number of circular saw-blades 5 mounted on a horizontally disposed shaft 6 and held spaced away from each other by means of sleeves 7, as shown in broken lines in Fig. 1, said saw-blades projecting upwardly through slots in the work-table 1. In order that the blades of the gang saw A may be spaced apart different distances I have provided the work-table with a removable comb which is made up of a plurality of strips 8 that are detachably connected to the work-table by means of fastening devices 9, said strips having slots between them for receiving the blades 5 of the gang saw, and said slots being preferably enlarged at their outer ends, as indicated by the reference character 10 in Fig. 1, so as to provide a clearance for the material that sticks to the teeth of the blades. The gang saw B and the parts that coöperate therewith are of substantially the same construction as the gang saw A, and therefore I have designated the corresponding parts of the gang saw B with the same reference characters used in connection with the description of the gang saw A with the prime-mark added.

The machine herein shown is adapted to be used principally for cutting large sheets of bakery products into small oblong-shaped wafers and therefore the blades of the gang saw A are spaced farther apart than the blades of the gang saw B, but it will, of course, be understood that it is immaterial so far as my invention is concerned whether the blades of the gang saws are spaced the same distance apart or different distances apart, the machine being so designed that the saw blades can be adjusted and thus enable the machine to be used for cutting different-sized cakes or wafers.

The feeding mechanism, which coöperates with the gang saw A, comprises a pusher 11 arranged in front of the gang saw A and provided with a depending flange 12 whose lower edge rests upon the work-table 1, said pusher being reciprocated or moved back and forth so as to move a number of superimposed sheets of bakery products X through the gang saw A and into position to be engaged by the pusher 11' which coöperates with the gang saw B, as shown in Fig. 3, the pusher and the other parts of the feeding mechanism which coöperates with the gang saw B being designated by the same reference characters used in the description of the feeding mechanism for the gang saw A with the prime-mark added.

The flange 12 of the pusher 11 is provided with slots 13 through which the blades of the gang saw A pass during the operation of feeding the sheets through said saw, and said flange is also provided with cut-out portions 14 so as to provide clearances for the guides 15 on the work-table that deflect the cut edge portions of the sheets downwardly into a suitable receptacle arranged under the work-table, thus preventing the portions which are trimmed from the edges of the sheets from passing onto that portion of the work-table over which the pusher 11' moves.

Any suitable means may be provided for reciprocating the pusher 11 but I prefer to use the mechanism herein shown which consists of a lever 16 pivotally connected at its lower end to a bracket 17 on the bed-plate and having its upper end connected by means of a link 18 to a bracket 19 on the pusher 11, said bracket projecting downwardly from the pusher through a slot 19ª formed in the work-table. The lever 16 is rocked or oscillated by means of a rod 20 pivotally connected to said lever intermediate its ends, as shown in Fig. 3, and having its front end pivotally connected to a crank arm 21 on a shaft 22 which is journaled in bearings 23 on the bed-plate. The shaft 22 is normally idle but a clutch is provided for connecting said shaft to a driving member whenever the operator desires to feed the sheets to the gang saw A, said clutch being hereinafter described.

The shaft 6' which carries the gang saw B, constitutes the main drive shaft of the machine and is provided at its outer end with a pulley 24 for receiving a driving belt, not shown, and at its inner end with a miter gear 25 which meshes with a miter gear 26 on the shaft 6 of the gang saw A, thereby causing said saw shafts to operate continually. A belt 27 which surrounds a pulley on the shaft 6 and also a large pulley 28 on a sprocket wheel shaft 29 causes a sprocket wheel on said shaft 29 to rotate continually and thus drive a sprocket chain 30 which passes over a large sprocket wheel 31 which is loosely mounted on the crank shaft 22 of the feeding mechanism. A clutch is provided for connecting the crank shaft 22 to the continually rotating sprocket wheel 31, and in the construction herein shown said clutch consists of an expansion ring 32 connected to the shaft 22 and arranged inside of a sleeve or circular flange 33 that projects laterally from the sprocket wheel 31, as shown clearly in Figs. 6 and 7. One end of the expansion ring 32 is permanently connected to an arm 34 pinned on the crank shaft 22, and a bell crank lever 35 is pivotally connected to said arm 34 in such a manner that when its long arm is rocked in the direction indicated by the arrow in Fig. 7, its short arm will bear against the free end of the expansion ring 32 and thus expand said ring or force it tightly against the sleeve 33 inside of which it is arranged, thereby causing the crank shaft 22 to be connected to the driving sprocket 31. If desired, the short arm of the bell crank lever 35 can be provided with an adjusting screw 36, as shown in Fig. 7, so as to permit the frictional engagement of the expansion ring 32 and the sleeve 33 to be varied. A manually-operated lever 37, which is arranged at the front of the machine, imparts movement to a cone 38 loosely mounted on the crank shaft 22 so as to cause said cone to engage the bell crank lever 35 and thus rock said lever in a direction to expand the ring 32. The operator actuates the lever 37 whenever he desires to have the pusher 11 feed the sheets through the gang saw A, and after said pusher has fed the sheets through the gang saw and has returned to its starting position, the crank shaft 22 is automatically disconnected from the driving sprocket 31 by means of a disk 39 pinned to the crank shaft 22 and provided with a cam 40 that engages a hook 41 on the lever 37 and thus causes said lever to shift the cone 38 out of engagement with the bell crank lever 35 which holds the ring 32 expanded. To overcome the possibility of the expansion ring 32 remaining in engagement with the sleeve on the driving sprocket 31 I have provided the disk 39 with a lug 42 which strikes against a stop 43 on the lever 37 when the pusher 11 arrives at its starting position.

As previously stated, the feeding mechanism which coöperates with the gang saw B is of practically the same construction as that which coöperates with the gang saw A and therefore I have not specifically described all of the parts of said mechanism.

The pusher 11 is guided in a straight path back and forth over the work-table by means of a track 44 against which one end of the pusher bears, said pusher being provided with clips 45 that hook over the upper edge of said track, as shown clearly in Figs. 1 and 5. Guards 46 and 46' are arranged over the gang saws A and B, respectively, so as to prevent damage to the operators of the machine, and these guards are spaced far enough away from the work-table to permit the pushers to travel under same. A receiving table 47 which is located behind the gang saw B, and in a lower horizontal plane than the work-table 1, is provided with a pair of bails 48 which can be raised and lowered by means of a rod 49, as shown in Figs. 1 and 4. These bails are used to support a tray or receptacle Y for receiving the cakes or wafers after they pass through the gang saw B, and by manipulating the rod 49 the operator can raise or lower the tray so that the bottom of the tray or the top face of the pile of articles therein will be level with the top face of the work-table; that is to say, when the machine is first started the operator moves the bails 48 into such a position that the bottom of the tray which rests thereon is level with the work-table, the bar 49 being provided with a notch 50 which receives a locking pin 51 so as to hold the bails in their elevated position. After one batch of sheets has been fed through the machine and cut into small cakes or wafers the operator releases the bar 49 from the pin 51 and moves said bar into such a position that the notch 50ª therein engages the pin 51. The top surface of the pile of wafers in the tray Y will now be level with the work-table so that the next batch of wafers can be fed from the gang saw B directly into said tray.

A machine of the construction above described will cut large sheets of bakery products into small cakes or wafers quickly and without liability of breaking the sheets, the machine being so designed that a number of superimposed sheets can be cut simultaneously. The operators do not have to handle the sheets after they have been placed upon the table for the pushers feed the sheets automatically through the gang saws which cut them into small pieces so that there is very little danger of the sheets breaking while they are being cut. The feeding mechanisms are so designed that they make one complete operation and then come to rest automatically, and the levers which control the clutches are within easy reach of the two operators who stand at the front and left hand side of the machine. The machine is so designed that it can be cleaned easily and as the driving elements of the machine are arranged under the work-table and the gang saws are protected by guards which extend over same there is little danger of the operators being hurt when the machine is in operation.

Having thus described my invention, what I claim as new and desire to secure by Letters Patent is:

1. A machine of the character described, comprising a work-table, means for feeding sheets of material over said table and cutting them into small pieces, a receiving table, bails pivotally mounted on said receiving table for supporting a tray, means for raising and lowering said bails, and means for locking said bails in either position.

2. A machine of the character described, provided with a plurality of saws and a reciprocating feeder adapted to coöperate with said saws to feed material to and beyond same, said feeder being of an inverted box shape and having a top which covers the saws while the material is being fed through same.

3. In a machine of the character described, a work-table, a gang-saw composed of a plurality of circular saw blades and arranged in an opening in said work-table, curved scrap guides arranged on each side of the gang-saw, a reciprocating feeder and operating mechanism therefor adapted to coöperate with said gang-saw to feed material to said saw, said feeder comprising a front wall slotted to receive the saw blades, side walls cut away to receive the scrap guides, a rear wall to which is pivotally connected the feeder-operating mechanism, and a top face which lies in a higher plane than the tops of said saws and adapted to pass over said saws while feeding material through same.

In testimony whereof I hereunto affix my signature in the presence of two witnesses, this twenty fifth day of July 1910.

WILLIAM WOLLBRINCK.

Witnesses:
 WELLS L. CHURCH,
 GEORGE BAKEWELL.

---

Copies of this patent may be obtained for five cents each, by addressing the "Commissioner of Patents, Washington, D. C."